US008871077B2

(12) United States Patent
Song et al.

(10) Patent No.: US 8,871,077 B2
(45) Date of Patent: Oct. 28, 2014

(54) CORROSION-RESISTANT PLATING SYSTEM

(75) Inventors: Guangling Song, Troy, MI (US); William A. Schumacher, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 13/273,914

(22) Filed: Oct. 14, 2011

(65) Prior Publication Data

US 2013/0093199 A1 Apr. 18, 2013

(51) Int. Cl.
| | |
|---|---|
| *C25D 5/10* | (2006.01) |
| *C25D 5/14* | (2006.01) |
| *C23C 28/00* | (2006.01) |
| *B60R 19/02* | (2006.01) |
| *C23C 28/02* | (2006.01) |
| *B05D 1/36* | (2006.01) |
| *B05D 3/00* | (2006.01) |
| *B05D 5/00* | (2006.01) |
| *B05D 7/14* | (2006.01) |

(52) U.S. Cl.
CPC . *B05D 1/36* (2013.01); *B60R 19/02* (2013.01); *C23C 28/02* (2013.01); *B05D 3/00* (2013.01); *B05D 5/00* (2013.01); *B05D 7/14* (2013.01)
USPC ........... 205/197; 205/177; 205/180; 205/183; 205/184; 205/185; 205/187

(58) Field of Classification Search
USPC .......... 427/406; 205/177, 180, 197, 178, 183, 205/184, 185, 187
See application file for complete search history.

(56) References Cited

U.S. PATENT DOCUMENTS

| | | | | |
|---|---|---|---|---|
| 3,090,733 | A | * | 5/1963 | Brown .......................... 428/639 |
| 8,052,224 | B2 | | 11/2011 | Luo et al. |
| 8,187,439 | B2 | | 5/2012 | Wang et al. |
| 8,187,440 | B2 | | 5/2012 | Song |
| 2004/0237282 | A1 | | 12/2004 | Hines .......................... 29/527.2 |

(Continued)

FOREIGN PATENT DOCUMENTS

| | | | | | |
|---|---|---|---|---|---|
| JP | 06033211 | A | * | 2/1994 | ................ C23C 2/06 |
| JP | 10025594 | A | * | 1/1998 | ................ C25D 3/12 |
| WO | WO 2010006800 | A1 | * | 1/2010 | ................ C25D 5/14 |

OTHER PUBLICATIONS

Tremmel, "Methods to Improve the Corrosion Performance of Microporous Nickel Deposits", Plating & Surface Finishing (Oct. 1996), pp. 24-28.*

(Continued)

*Primary Examiner* — Edna Wong
(74) *Attorney, Agent, or Firm* — Harness, Dickey & Pierce P.L.C.

(57) ABSTRACT

Methods of providing a corrosion-resistant plating on a steel bumper are provided. A galvanized zinc layer is deposited over a steel substrate. A plurality of nickel layers is deposited over the zinc layer. The plurality of zinc layers has at least a first porosity and a second porosity. A chrome layer is applied over the plurality of nickel layers. The porous nickel layer is immediately adjacent the chrome layer such that a stress applied to the chrome layer is distributed over the porous nickel layer. The porous nickel layer delocalizes a stress applied at an impact area to a dispersed area and the dispersed area is larger than the impact area.

7 Claims, 3 Drawing Sheets

(56) References Cited

U.S. PATENT DOCUMENTS

| | | |
|---|---|---|
| 2004/0237779 A1 | 12/2004 | Ma et al. .................... 95/55 |
| 2007/0063521 A1 | 3/2007 | Lancashire et al. ........... 293/102 |
| 2009/0269501 A1 | 10/2009 | Song et al. |
| 2010/0051452 A1 | 3/2010 | Song et al. |
| 2010/0273023 A1 | 10/2010 | Song et al. |
| 2011/0064941 A1 | 3/2011 | Sachdev et al. |
| 2012/0273710 A1 | 11/2012 | Song et al. |
| 2012/0301603 A1 | 11/2012 | Carlson et al. |

OTHER PUBLICATIONS

Rout, "Electrochemical Impedance Spectroscopy Study on Multi-Layered Coated Steel Sheets", Corrosion Science (no month, 2007), vol. 49, pp. 794-817.*

Alwitt, Robert S., "Anodizing", Electrochemistry Encyclopedia, (Dec. 2002), Boundary Technologies, Inc., <http://electrochem.cwru.edu/encycl/art-a02-anodizing.htm>, 9 pages.

Ernest, T., Sorensen, R., and Guilinger, T., "Effectiveness of Nickel Plating In Inhibiting Atmospheric Corrosion of Copper Alloy Contacts", Sandia National Laboratories. 5 pages. Available from: http://www.osti.gov/bridge/servlets/purl/674975-LX14EM/webviewable/674975.pdf.

Wikipedia contributors. Electroplating [Internet]. Wikipedia, The Free Encyclopedia; [cited Oct. 13, 2011]. 5 pages. Available from: //en.wikipedia.org/w/index.php?title=Electroplating&oldid=454473495.>.

Wikipedia contributors. Plating [Internet]. Wikipedia, The Free Encyclopedia; [cited Oct. 13, 2011]. 5 pages. Available from: //en.wikipedia.org/w/index.php?title=Plating&oldid=454798143.

* cited by examiner

CORROSION-RESISTANT PLATING SYSTEM

FIELD

The present disclosure relates to methods of providing a corrosion-resistant plating system, and more particularly, for corrosion-resistant plating systems for automotive applications.

BACKGROUND

This section provides background information related to the present disclosure which is not necessarily prior art.

Corrosion on metal components should be controlled to preserve the visual aesthetics and longevity of the component. In automotive applications, corrosion may detract from the look of the automobile. For example, nickel plated steel bumpers may show cosmetic corrosion. The cosmetic corrosion is not necessarily due to weather or "wear and tear" of the automobile. The cosmetic corrosion may also be caused by micro-cracking that occurs during installation or service on the bumper. Further, with the addition of elements such as ground effects or other decorative items, additional microcracks may occur in the bumper. Protective top coatings have been employed on various metal substrates, including automotive components, to prevent or hinder corrosion. However, these top coats may be subject to cracking or may be brittle, thus exposing the component to corrosion.

SUMMARY

This section provides a general summary of the disclosure, and is not a comprehensive disclosure of its full scope or all of its features.

The present teachings include methods of providing a corrosion-resistant plating on a steel bumper. A galvanized zinc layer is deposited over a steel substrate. A plurality of nickel layers is deposited over the zinc layer. The nickel layers provide at least two different porosities. A chrome layer is applied over the plurality of nickel layers.

In still other aspects of the present teachings, a method of mitigating corrosion on a steel bumper having a chrome layer and a bright nickel layer coated thereon is provided. A porous nickel layer is arranged immediately adjacent the chrome layer such that a stress applied to the chrome layer is distributed over the porous nickel layer. The porous nickel layer delocalizes a stress applied at an impact area to a dispersed area and the dispersed area is larger than the impact area.

In yet other aspects of the present teachings, a bumper is provided. The bumper includes a steel substrate, a zinc layer, a plurality of nickel layers, where at least one nickel layer is porous, and a chrome layer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
FIG. 1 depicts a generic bumper according to various aspects of the present teachings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% of the indicated value of 5% variance from usual methods of measurement. For example, a component of about 10 wt. % could vary between 10±0.5 wt. %, thus ranging from between 9.5 and 10.5 wt. %.

In select aspects, the present teachings provide methods of preventing corrosion on a component, such as the generic bumper 10 as depicted in FIG. 1. While illustrations or examples detailed herein may relate to a bumper 10, the methods detailed are suitable for use in other automotive applications. Still further, the techniques are suitable for non-automotive applications, including general industrial uses, tools, household items, marine items, and the like.

Corrosion-resistant refers to a material's reduced susceptibility to corrosion including chemical attack mechanisms such as oxidation (i.e. inadvertent electrochemical reaction), acid attack, or both. "Relatively" corrosion-resistant refers to a material's ability to better resist corrosion when compared with other similar materials, resulting in a lower corrosion rates and a longer lifespan. The methods of the present teachings provide both corrosion-resistant and relatively corrosion-resistant apparatuses.

Figure 2:
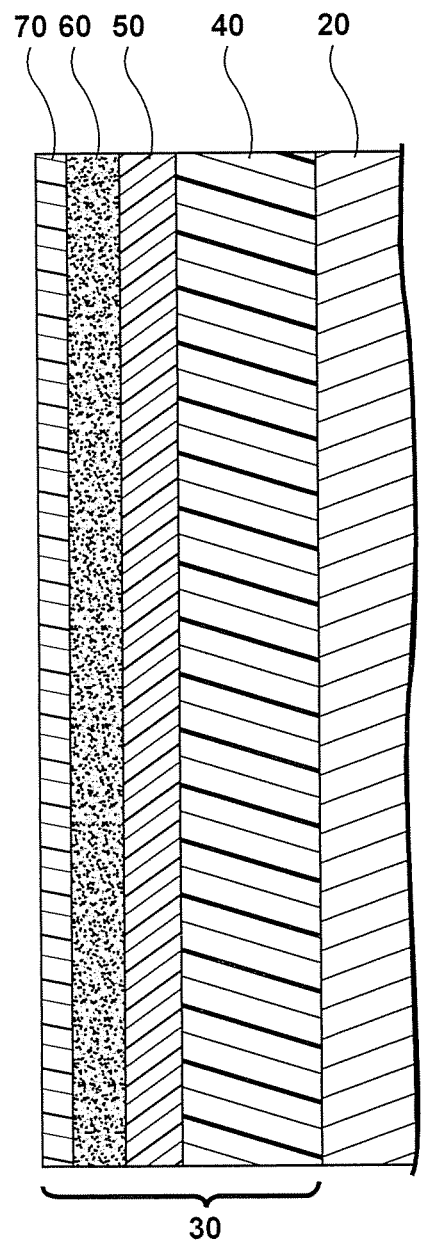
FIG. 2 depicts a sectional view of a coated system according to various aspects of the present teachings.

Turning to FIG. 2, a substrate 20 is coated with the corrosion-resistant plating 30. The corrosion-resistant plating 30 includes a zinc layer 40, at least one nickel layer 50, and a porous nickel layer 60. The porous nickel layer 60 is coated with a chrome layer 70 in select aspects. The various layers may cover all or a portion of the substrate 20.

The methods and apparatus disclosed in the present teachings provide excellent corrosion-resistant and relatively-corrosion-resistant properties by combining impact stress distribution along with a sacrificial layer on the substrate 20. The "stress distribution" refers to a localized impact where the force is distributed over a much larger area as compared to the impact area. The stress distribution supplements the sacrificial layer which protects the underlying substrate 20. Further, the corrosion-resistant plating 30 delocalizes corrosion initiation as will be detailed below.

The substrate 20 is made of any suitable material. In various aspects, the substrate 20 is made of a steel material. The substrate 20 is shaped into the form of a bumper after application of the corrosion-resistant plating 30.

Optionally, the substrate 20 is pre-cleaned to remove any debris, such as is known in the art. Between applications of each respective layer, there is another optional cleaning or drying stage. This allows the preceding layer to provide an appropriately prepared base for the subsequent layers. Such cleaning typically serves to remove any loosely adhered contaminants, such as oils, grease, waxy solids, particles (including metallic particles, carbon particles, dust, and dirt), silica, scale, and mixtures thereof. Many contaminants are added during the manufacturing of the metal material, and may also accumulate on the surface during transport or storage. Thus, pre-cleaning is useful in circumstances where the substrate is soiled with contaminants. In various aspects, pre-cleaning includes mechanical abrasion; cleaning with traditional alkaline cleaners, surfactants, or mild acid washes; or ultrasonic cleaning.

The choice of the appropriate cleaning process or sequence of cleaning processes is selected based upon both the nature of the contaminant and the substrate. If needed, any metal oxides can be removed by plasma etching or by sputtering. Any method of removing oxides known to one of skill in the art that does not detrimentally impact the physical properties of the metal is within the scope of the present teachings.

The zinc layer 40 provides a barrier to protect the substrate 20 from micro-cracks and other damage that leads to or expedites corrosion. The zinc layer 40 prevents corrosion of the substrate 20 by forming a physical barrier and acting as a sacrificial anode.

Should the zinc layer 40 be exposed to the atmosphere, the zinc reacts with oxygen to form zinc oxide, which further reacts with water molecules in the air to form zinc hydroxide. The zinc hydroxide reacts with carbon dioxide in the air to yield a thin and impermeable layer of zinc carbonate which adheres to and protects the underlying zinc from additional corrosion. The zinc layer 40 facilitates the corrosion-resistant or relatively corrosion-resistant properties.

Further, the zinc layer 40 provides the cosmetic benefit of preventing the reddish-brown rust color that is unappealing, particularly on exposed components. If exposed to the atmosphere as a result of an impact or cracking, the zinc layer 40 provides a corrosion product that is white in color. This white color is less stark next to the chrome layer 70 as compared to the reddish-brown rust color.

Additionally, the zinc layer 40 may be not as brittle as the nickel layers. Thus, the zinc layer 40 being immediately adjacent to substrate 20 provides less cracking as compared to a nickel layer that would be immediately adjacent substrate 20. The reduction in cracking protects the underlying substrate 20.

The zinc layer 40 is considered a galvanized element. The galvanizing can be performed using a continuous line, such as a steel strip or individual items such as a bumper 10.

The zinc layer 40 in various aspects is applied by electroplating, hot dipping, or any other suitable application technique. Electroplating the zinc layer 40 provides an even coverage and improved adherence between the substrate 20 and the zinc layer 40. Generally, electroplating refers to a plating process in which metal ions in an electrolyte solution are distributed by an electric field to coat an electrode. Current is directed to the anode, oxidizing metal atoms of the anode so they dissolve in the electrolyte. At the cathode, the dissolved particles are deposited to coat a conductive object with a thin layer of the metal. The electroplating process parameters and time are modified to build up the thickness of the layer or of the part.

Other electroplating processes include brush electroplating where localized areas or entire items are plated using a brush saturated with plating solution, as is known in the art. Still further, electroless deposition is suitable. In electroless deposition, a reducing agent is used in the process to allow plating using only one electrode and no external source of electrical current.

Generally, hot dipping refers to the process of coating a substrate with a thin metal layer by passing the substrate (such as steel) through a molten bath of the metal. For example, when applying a zinc coating, the temperature is about 460° C. As detailed above, when the pure zinc is exposed to the atmosphere, it reacts with oxygen to form zinc oxide, which further reacts with carbon dioxide to form zinc carbonate to protect the steel.

Regardless of the application technique chosen, after application of the zinc layer 40, the zinc layer 40 is dried for a time and under conditions sufficient to prevent dislodging thereof by any subsequent layer application. Once the zinc layer 40 is prepared, the nickel layer 50 is applied using similar application techniques. As a non-limiting example, the nickel layer 50 is applied using electroplating techniques.

The nickel layer 50 is substantially solid. The nickel layer 50 is chosen from bright nickel, semi-bright nickel, and combinations thereof. Generally, the substantially solid nickel layer 50 provides coverage of from equal to or greater than about 95% of the desired area to be plated, including all sub-ranges. In other aspects, the substantially solid nickel layer 50 is continuous and provides 100% coverage to the desired area to be plated.

The porous nickel layer 60 is applied over the nickel layer 50. The porous nickel layer 60 provides less than about 95% coverage of the desired area to be plated, including all sub-ranges. In other aspects, the porous nickel layer 60 covers from about 50% to about 90% of the desired area to be plated, including all sub-ranges.

The combination of the porous nickel layer 60 and the solid nickel layer 50 provide a synergy with the sacrificial zinc layer. Further, the porous nickel layer 60 facilitates delocalization of stress at the impact area and also delocalizes the corrosion at the impact area.

In various aspects, the porous nickel layer 60 is formed by electroplating process. Traditionally, electroplating processes are designed to produce a substantially smooth electroplated layer with no pores. By modifying the parameters of the electroplating process, the present teachings uses electroplating to provide a discontinuous porous nickel layer 60. The porous nickel layer 60 is formed in select aspects by electroplating using high plating rates, such as those that produce "burnt deposits." A "burnt deposit" is a generic term that covers a wide range of deposits that can occur with an attempted increase in throughput by increasing the current density and plating rate for a given product. Burnt deposits appear rough and granular, and as a result are undesirable in standard electroplating processes. In still other aspects, the porous nickel layer 60 is formed by controlling the plating current and variables in the chemistry of the electroplating bath to thereby control the size and nature of the rough and granular burnt deposits.

The size and nature of the pores and the percent porosity of the porous nickel layer 60 are controlled by the electroplating current density and current wave form. For example, standard direct current plating, pulsed current plating, and periodic reverse current plating are suitable to form and control the size and nature of the pores and the percent porosity. Still further, parameters such as low bath temperature, low metal concentration, low agitation, and/or the use of other bath additives can also produce porous layers.

Higher average current densities are also suitable to produce a porous layer with a higher percent porosity. As a non-limiting example, a porous layer having a percent porosity of about 30% may be formed using direct current at a current density of about 90 ASF and a porous layer having a porosity of about 90% may be formed using direct current at a current density of about 180 ASF.

A chrome layer 70 is then applied to the porous nickel layer 60. The combination of the layers provides the corrosion-resistant layer 30. When the corrosion-resistant layer 30 is subjected to a stress such as a micro-crack, the localized force is distributed over the porous nickel layer 60, the solid nickel layer 50 (and optionally any other solid nickel layers) and through the zinc layer 40. The stress is distributed over a wider area as compared to the impact area. The stress distribution is both depth-wise and width-wise. This prevents the underlying substrate 20 from being damaged and thus, causing the component to be susceptible to corrosion. The susceptibility to corrosion is significantly reduced as compared to components in which do not include the corrosion-resistant plating 30 as detailed herein.

Figure 3:
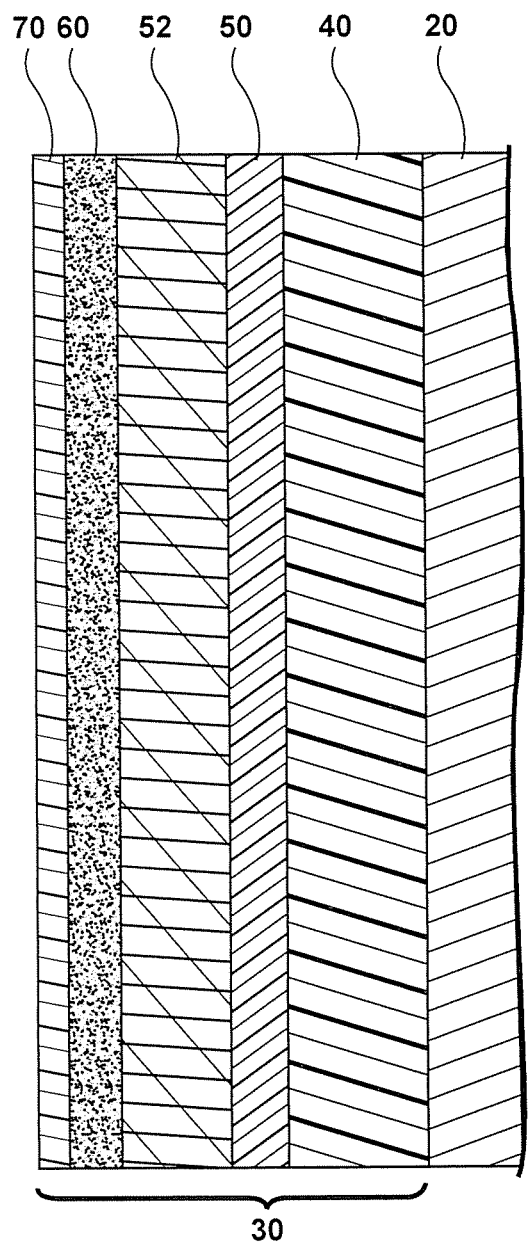
FIG. 3 depicts a sectional view of a coated system according to various aspects of the present teachings.

Turning to FIG. 3, the substrate 20 is coated with the zinc layer 40, a first nickel layer 50, a second nickel layer 52, and a porous nickel layer 60. In such aspects, at least one of the first nickel layer 50 and the second nickel layer 52 are substantially solid. The substantially solid layer(s) as combined with the porous nickel layer 60 provides a combination of porosities amongst the nickel.

In summary, the present teachings provide methods of providing a corrosion-resistant plating on a steel bumper. A galvanized zinc layer is deposited over a steel substrate. The galvanized zinc layer serves as a sacrificial layer. A plurality of nickel layers is deposited on the zinc layer. The plurality of nickel layers has at least a first porosity and a second porosity. A chrome layer is applied over the plurality of nickel layers. The plurality of nickel layers include a porous nickel layer and at least one layer selected from the group consisting of a substantially solid semi-bright nickel layer, a substantially solid bright nickel layer, and combinations thereof. At least one of the nickel layers is applied using electroplating in select features. The substantially solid semi-bright nickel layer or the substantially solid bright nickel layer has less than about 5% porosity. In select aspects, a semi-bright nickel layer is deposited over the galvanized zinc layer. In other aspects, a porous nickel layer is deposited immediately adjacent the chrome layer. Substrates made according to this method distribute and delocalize a stress applied to the chrome layer. The stress may be distributed to the zinc layer to prevent corrosion from developing at the steel substrate.

In still other features, the present teachings provide methods of corrosion on a steel bumper having a chrome layer and a bright nickel layer coated thereon. A porous nickel is arranged layer immediately adjacent the chrome layer such that a stress applied to the chrome layer is distributed over the porous nickel layer. The porous nickel layer delocalizes a stress applied at an impact area to a dispersed area and the dispersed area is larger than the impact area. In select aspects, a zinc layer is electroplated onto the steel substrate prior to application of the bright nickel layer. Optionally, a bright nickel layer is applied over the zinc layer. The substrate and/or the layers are cleaned prior to application of adjacent layers. In select aspects, the method further includes electroplating a zinc layer over a steel substrate; depositing a substantially non-porous nickel layer over the zinc layer; depositing the porous nickel layer over the substantially non-porous nickel layer; and depositing the chrome layer over the porous nickel layer. This method allows for distribution of an applied stress to the zinc layer to prevent corrosion from developing at the steel substrate. In select aspects, a bumper for an automobile prepared according to the method.

In still other aspects, the present teachings provide a bumper. The bumper includes a steel substrate; a zinc layer; a plurality of nickel layers, where at least one nickel layer is porous; and a chrome layer. A stress applied to the chrome layer is distributed over the porous nickel layer, wherein the porous nickel layer delocalizes a stress applied at an impact area to a dispersed area and the dispersed area is larger than the impact area. The plurality of nickel layers in the bumper are selected from a semi-bright nickel layer, a bright nickel layer, and combinations thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of providing a corrosion-resistant plating on a steel bumper comprising:
   depositing a galvanized zinc layer over a steel surface of the steel bumper;
   depositing a plurality of nickel layers having at least a first porosity and a second porosity over the galvanized zinc layer, wherein at least one of the plurality of nickel layers is electrodeposited to form a burnt deposit layer; and
   applying a chrome layer over the plurality of nickel layers, wherein said burnt deposit layer is immediately adjacent to said chrome layer, so as to form the corrosion-resistant plating, wherein the corrosion-resistant plating delocalizes and distributes a stress applied at an impact area width-wise and depth-wise over a dispersed area that is larger than the impact area, so as to prevent damage to the steel bumper.

2. The method of claim 1, wherein the plurality of nickel layers comprises a first porous nickel layer comprised of said burnt deposit layer having the first porosity and at least one substantially solid nickel layer having the second porosity, wherein the at least one substantially solid nickel layer is selected from the group consisting of a substantially solid semi-bright nickel layer, a substantially solid bright nickel layer, and combinations thereof, and the at least one substantially solid nickel layer is adjacent to the galvanized zinc layer and the first porous nickel layer is adjacent to the chrome layer.

3. The method of claim 2, wherein the second porosity of the at least one substantially solid nickel layer is less than about 5%.

4. The method of claim 1, further comprising depositing a semi-bright nickel layer over the galvanized zinc layer.

5. The method of claim 1, wherein at least one of the plurality of nickel layers is applied by electroplating.

6. The method of claim 1, wherein the galvanized zinc layer is a sacrificial layer.

7. A method of providing a corrosion-resistant plating on a steel bumper comprising:
   depositing a galvanized zinc layer over a steel surface of the steel bumper;
   depositing a first nickel layer having a first porosity;
   electroplating to form a discontinuous burnt deposit second nickel layer having a second porosity, wherein the second porosity is greater than the first porosity; and
   applying a chrome layer over the discontinuous burnt deposit second nickel layer so as to form the corrosion-resistant plating, wherein the corrosion-resistant plating delocalizes and distributes a stress applied at an impact area width-wise and depth-wise over a dispersed area that is larger than the impact area, so as to prevent damage to the steel bumper.

* * * * *